W. S. OSBORNE.
DUST SEPARATOR OR GRADER.
APPLICATION FILED DEC. 3, 1914.

1,182,413.

Patented May 9, 1916.
5 SHEETS—SHEET 4.

Witnesses
Robert Karcher
Earl C. ...

Inventor
William S. Osborne.
By Harry Frease
Attorney.

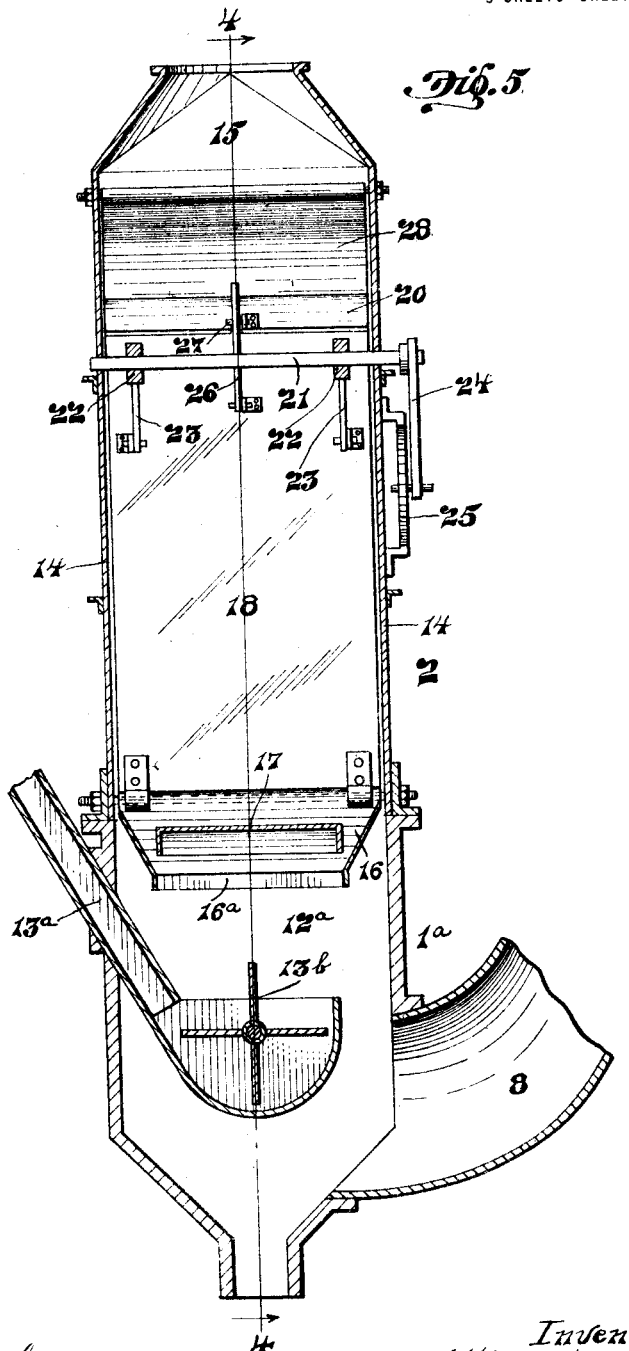

UNITED STATES PATENT OFFICE.

WILLIAM S. OSBORNE, OF CANTON, OHIO, ASSIGNOR TO THE BONNOT COMPANY, OF CANTON, OHIO, A CORPORATION OF OHIO.

DUST SEPARATOR OR GRADER.

1,182,413.   Specification of Letters Patent.   Patented May 9, 1916.

Application filed December 3, 1914. Serial No. 875,264.

*To all whom it may concern:*

Be it known that I, WILLIAM S. OSBORNE, a citizen of the United States, residing at Canton, in the county of Stark and State of Ohio, have invented certain new and useful Improvements in Dust Separators or Graders, of which the following is a specification.

The invention relates to pneumatic apparatus for segregating the finer or lighter particles of dust from the coarser or heavier particles which may be suspended or carried in a current of air; and the object of the improvement is to provide an apparatus which will contain within itself the means for automatically effecting a separation or grading of the finer from the coarser particles, and which may be adjusted so as to vary the relative degree of fineness or coarseness of the particles thus segregated, without varying the character, the speed, or the adjustment of the distributing means from which the separator may obtain a supply of dust and air, or of the impeller by means of which the dust laden air is circulated through the apparatus.

The separator may be mounted upon a grinding machine or other form of distributing mechanism which will scatter the dust to be graded into the path of an air current, and may deliver the same to a suitable dust collector, which in turn may discharge the dust into a proper receptacle and may return the air to the distributer for the separator; and again in the operation of the separator; and the surplus air which may be present in the apparatus may be discharged into the open air through an auxiliary collector, which in turn may deliver the dust collected therein to the outlet from the main collector. Such a use and application of the invention is illustrated in the accompanying drawings, forming part hereof, in which—

Figure 1:
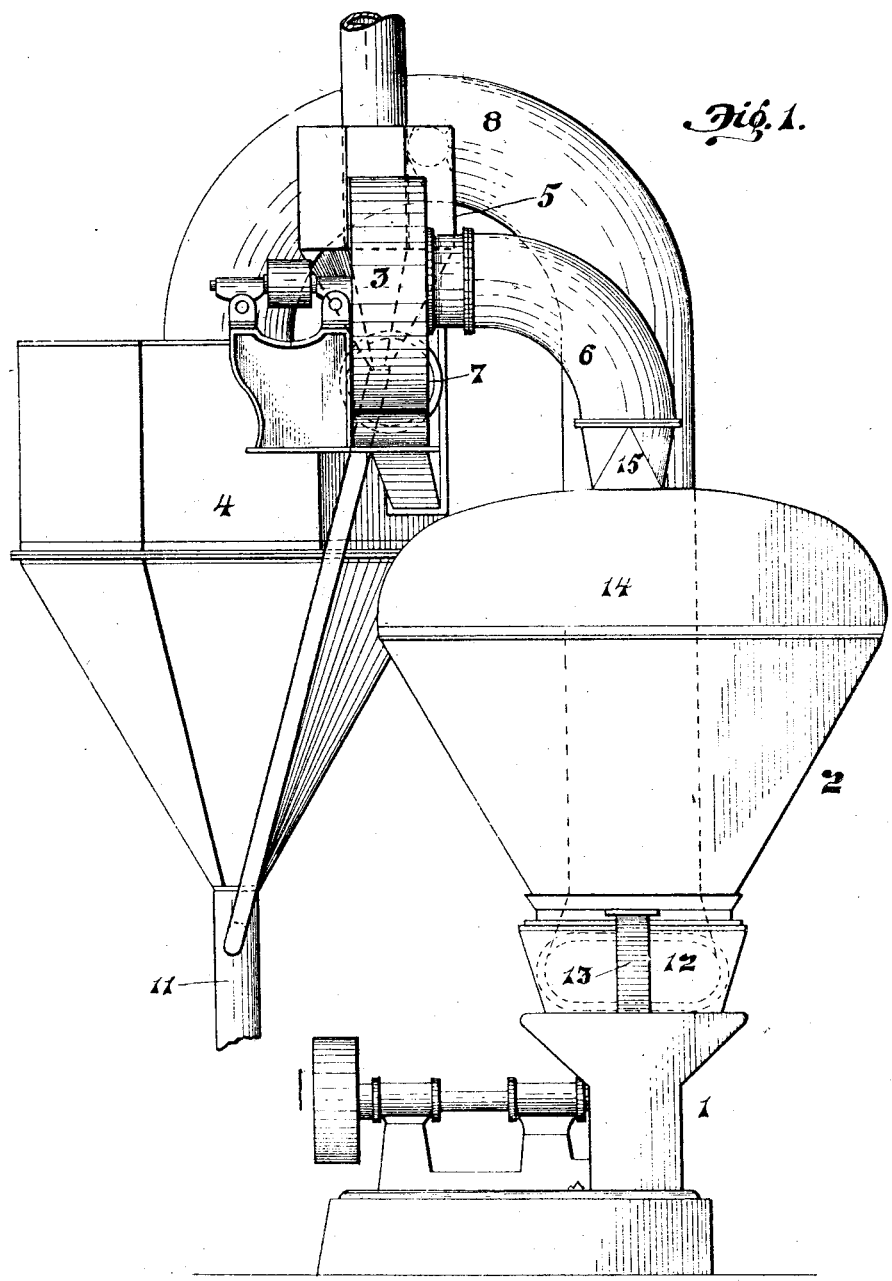
Figure 2:
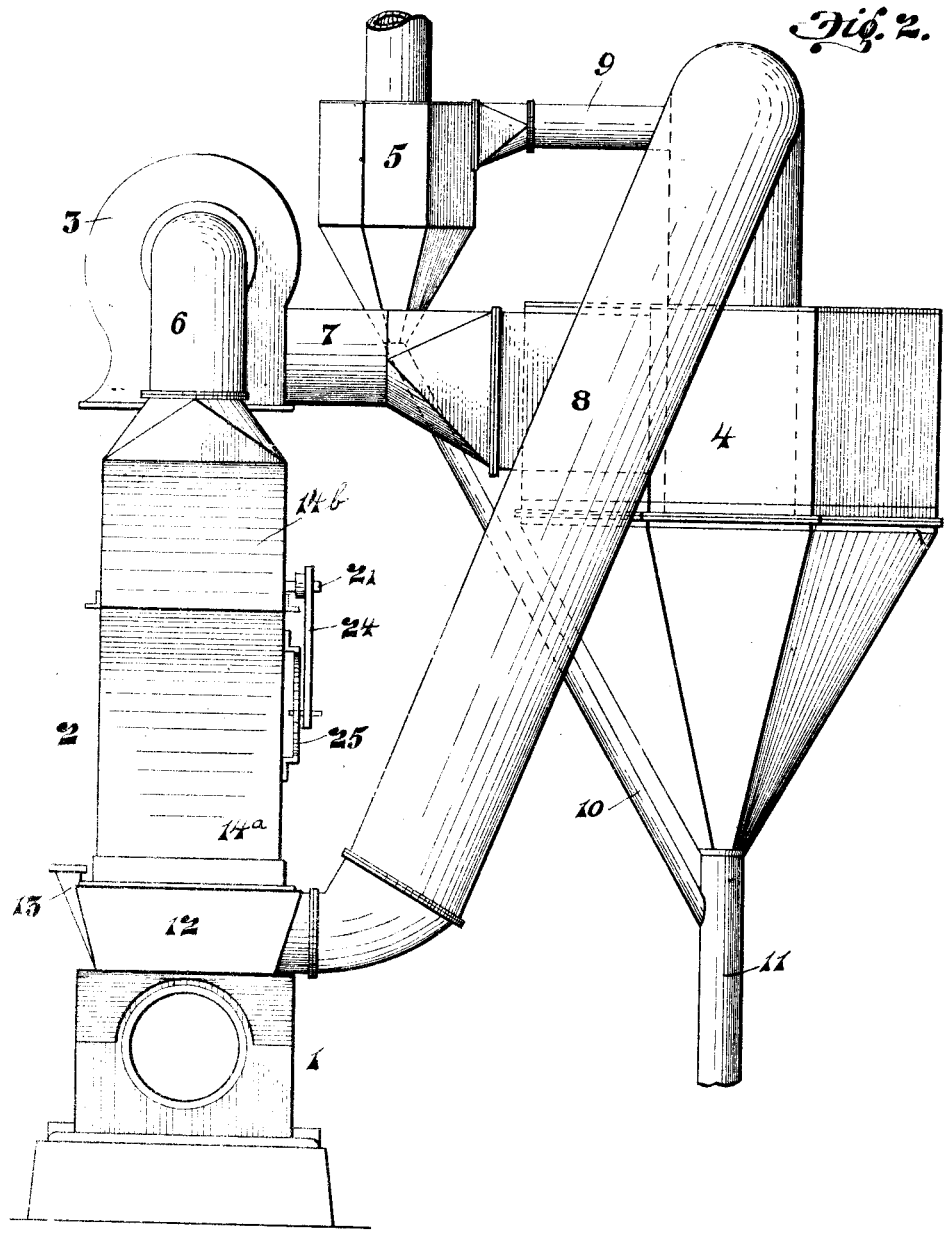
Figure 3:
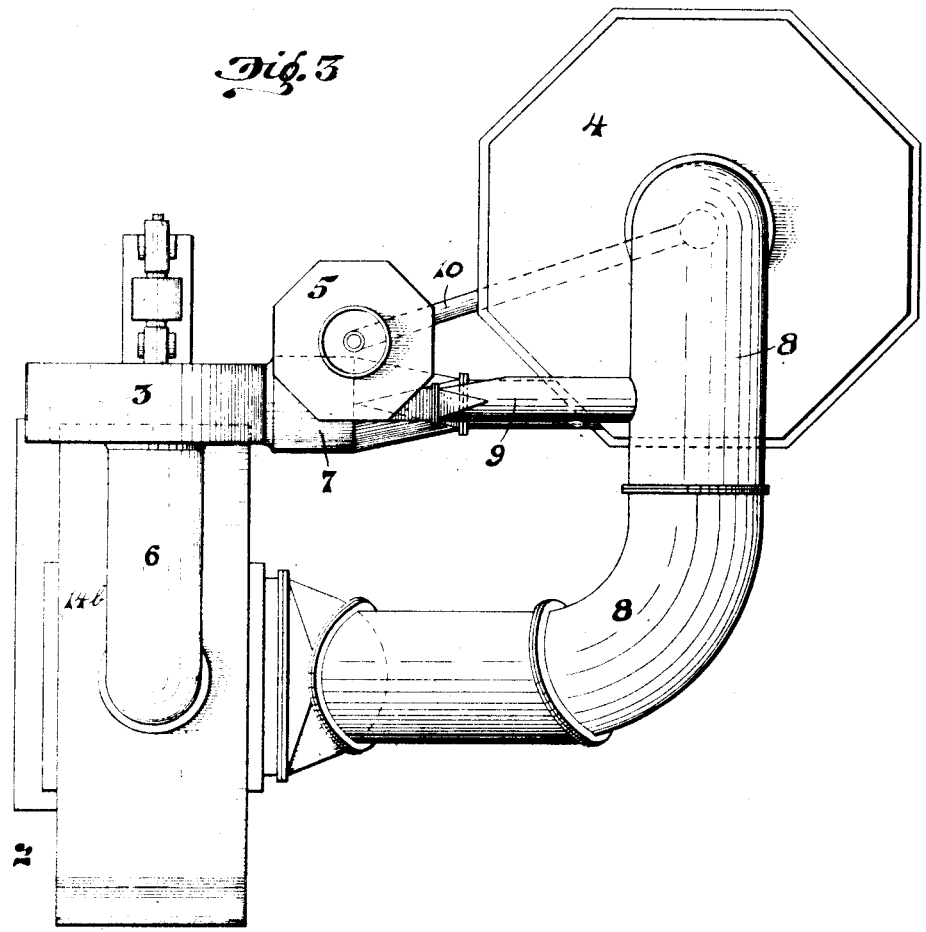
Figure 4:
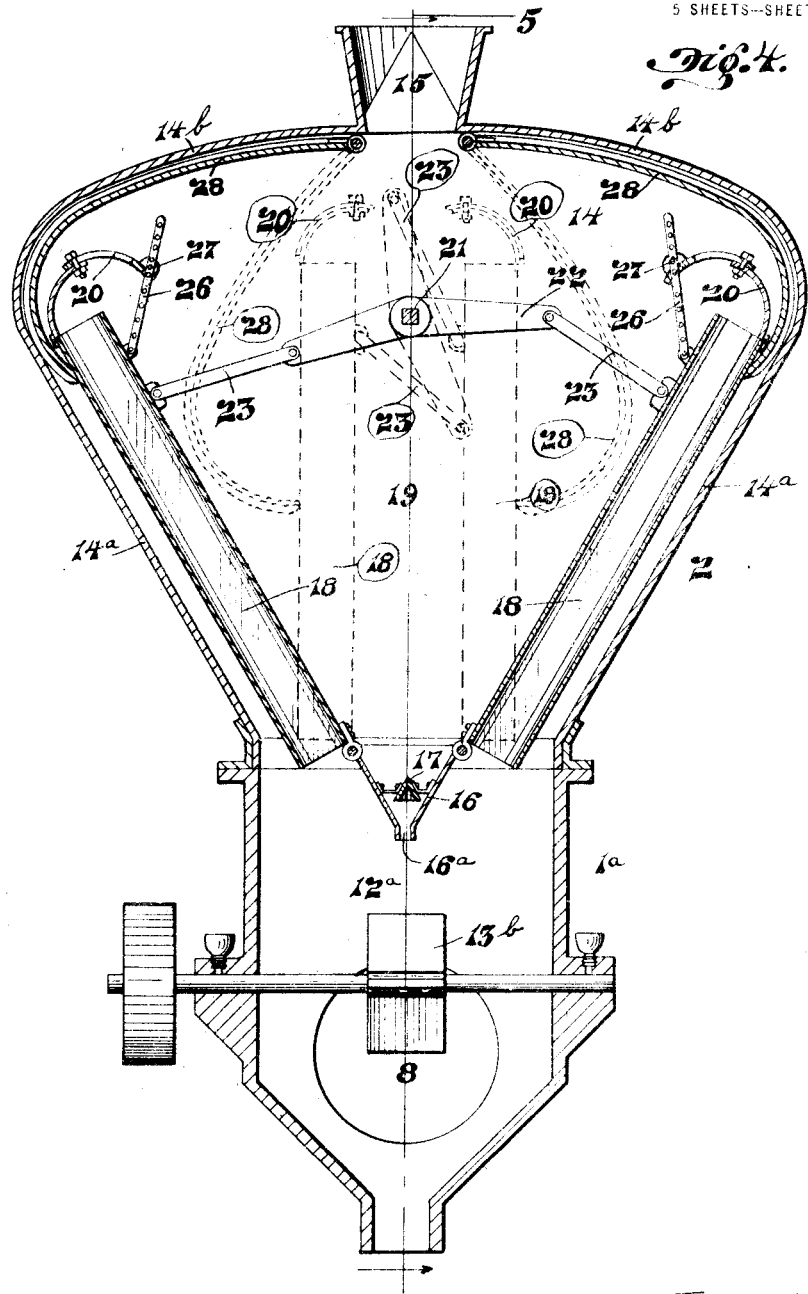

Figure 1 is a side elevation of the grinding, separating and collecting apparatus as a whole; Fig. 2, an end elevation of the same; Fig. 3, a plan view of the same; Fig. 4, a side elevation section of the separator, on line 4—4, Fig. 5, showing a modified form of distributer in connection therewith; and Fig. 5, an end elevation section of the separator, on line 5—5, Fig. 4.

Similar numerals refer to similar parts throughout the drawings.

The combined apparatus illustrated includes the distributer 1 or 1ᵃ, the separator 2, the centrifugal fan 3, the main collector 4 and the auxiliary collector 5; and these parts may be connected by the suction pipe 6 leading from the separator to the inlet of the fan, the discharge pipe 7 leading from the fan to the main collector, the return pipe 8 leading from the main collector back to the distributer, and the exhaust pipe 9 leading from the return pipe to the auxiliary collector; and the discharge pipe 10 from the auxiliary collector preferably leads into the discharge pipe 11 comprising the outlet for the main collector, so that the collected dust can be discharged or delivered, as may be desired.

When the distributer is in the form of the grinding machine 1, the same may be of the type shown in Letters Patent No. 924,439 and No. 928,368, to Chas. A. Dorn, *et al.*, or in my Letters Patent No. 710,604, from which the ground material is thrown or distributed directly upward into the distributing chamber 12, with which the return pipe 8 is connected; in which chamber the product of the grinding machine is subject to the suction caused by the centrifugal fan. The grinding machine is provided with a suitable feed inlet 13 for receiving the material to be crushed or pulverized.

When the separating apparatus is not combined directly with a grinding mechanism an ordinary form of distributing mechanism 1ᵃ, illustrated in Fig. 4, may be employed; the distributing chamber 12ᵃ of which communicates with the air return pipe 8 and is provided with a suitable feed inlet 13ᵃ through which the dust to be acted upon is supplied by any suitable means, and with a suitable agitator 13ᵇ. This mechanism distributes the dust, preferably upward in the distributing chamber 12ᵃ, wherein it is subject to the suction caused by the centrifugal fan.

The separator is provided with the flat parallel side walls 14, which may be connected by the upwardly diverging end walls 14ᵃ and the longitudinally arched top wall 14ᵇ to form a complete casing surrounding the separating mechanism, but such a complete casing is not essential to the proper operation of said mechanism. The lower end of the case rests upon and communicates with the upper end of the distributing chamber 12, and the outlet pipe 15 is centrally secured to the upper ends of the side walls and communicates with the suction pipe leading to the exhausting fan; so that when the fan is in operation, a constant circulation of air is maintained from the return pipe 8 through the distributer and the separator to the fan.

The transversely positioned trough 16 extends between and is centrally secured to the lower ends of the side walls of the separator, in the bottom of which trough is provided the slotted opening 16ª through which the coarser and heavier tailings of dust may return from the separator into the distributing chamber, from which it finds its way or is discharged automatically back into the grinding apparatus to be reground, or may be discharged from the tailings hopper into any suitable receptacle, as may be desired. The opening in the bottom of the tailings hopper is preferably shielded by the overhanging baffle plate 17, which obstructs the flow of the small amount of air which may be drawn through the tailings slot and prevents the same from flowing directly upward in the separator.

The separator is provided with a pair of rectangular conductor flues 18, which extend laterally from one side wall to the other of the casing, and are spaced apart so as to form an intervening separating chamber 19 between the flues and side walls of the case. The lower ends of the inner walls of these flues are hinged to the edges of the transverse trough; and to the upper ends of the outer walls thereof are hinged the arched deflectors 20, which extend upward and inward over the upper open end of the flues and thence downward so as to overhang the inner walls thereof, for the purpose of deflecting the air current and giving it a whirling motion which tends to separate and throw the coarser particles out of the path of the air as it takes an upward course to the central outlet of the separator.

The conductor flues are arranged to be swung outward upon their lower hinged ends from a substantially upright and nearly parallel position as shown by broken lines in Fig. 4, to the upwardly diverging position shown by full lines in the same figure. Suitable mechanism is provided for adjusting and holding the flues in desired position, which may comprise the rock shaft 21 journaled in the side walls, arms 22 fixed thereon, the links 23 connecting the arms with the flues, a suitable lever 24 on the rock shaft outside the case, and a segmental bar 25 secured to the side wall thereof with a pin or other form of latch for locking the lever in a desired position.

The arched deflectors 20 may be swung upward and downward upon their hinged ends so as to vary the downward angle of deflection of their free ends; but preferably they are not swung downward far enough to restrict the outlet of the conductor flues; and suitable locking means are provided for holding these deflectors in varying positions of adjustment, which may comprise the apertured arms 26 having the lower ends pivoted to the inner walls of the flues and adapted to have their apertures engaged by suitable bolts 27 mounted on the free edges of the deflectors. The deflectors are also preferably made in two sections, slidably connected together, so they may be retracted without swinging them on their hinges.

The upper end of the separating chamber 19 is closed on each side of the outlet pipe 15 by means of the follower wings 28 which have their inner ends hinged adjacent to the outlet pipe and their outer ends curved downward freely over the arched deflector, so that their free edges will contact with the outer walls of the flues. By this construction and arrangement the wings follow the movements of the flues and effect a closure of the top of the separating chamber, excepting only through the outlet pipe 15 above the center thereof. It is evident that the weight of these wings will serve to counterbalance the weight of the flues, thereby facilitating the adjustment thereof.

By this construction and arrangement it is evident that the dimensions or cross area of the separating chamber can be varied at will by swinging the flues inward or outward upon their hinged ends; so that the velocity of the air, and the pressure or the partial vacuum therein will be correspondingly varied, depending upon whether the circulation of air therethrough is forced by a pressure blower or induced by an exhausting fan; and when a partial vacuum is formed it is evident that the decreased weight of the rarefied air serves to permit the separation or grading of the dust to a greater degree of fineness than when a pressure is present.

In the operation of the apparatus the upwardly distributed dust is carried into and through the conductor flues with the air, and at the upper end thereof is deflected inward and downward into the separating chamber, wherein the coarser heavier particles continue downward by the combined action of their momentum and the force of gravity into and through the slot in the tailings trough forming the bottom of the chamber, while the finer lighter particles which are buoyant enough to float in the rarefied air are carried thereby through the outlet pipe and are delivered by the exhausting fan into the main collector.

It is evident that the conditions in the separating chamber can be varied at will by an outward or inward adjustment of the flues, as described; and also by an upward and downward adjustment or by an extension or retraction of the arched deflectors; by which means the relative degree of fineness or coarseness into which the particles of dust are separated or graded may be varied as desired.

In distinguishing this invention from others designed to perform a like service, it is noted that in other machines the volume of air used in separating and conveying the material is controlled by a blast gate or other supplemental restricting means between the fan and separator, which, by opening or closing, increases or diminishes the volume of air to obtain the desired degree of fineness. Such method cuts down the capacity and leaves a large percentage of fine material in the tailings, while in this invention the volume of air used in separating and conveying the finer particles remain the same. Each cubic foot of air is filled with dust to its maximum carrying capacity while passing through the separator. The area of the separating chamber is increased or diminished for regulating the velocity and carrying capacity of the air, thus giving an increased capacity and thoroughly cleaning the tailings, while producing a finished product of the desired degree of fineness.

I claim:

1. A dust separator including a distributing chamber, a tailings hopper mounted thereon, unrestricted flues leading from the distributing chamber, side and cover walls forming a separating chamber between the flues, an outlet pipe at the upper end of the separating chamber, and means for circulating air from the distributing chamber through the separating chamber to the outlet.

2. A dust separator including a distributing chamber, a tailings hopper mounted thereon, flues hinged at the sides of the hopper, side and cover walls forming a separating chamber between the flues, an outlet pipe at the upper end of the separating chamber, and means for exhausting air therefrom.

3. A dust separator including a distributing chamber, a tailings hopper mounted thereon, unrestricted flues at the sides of the hopper, side and cover walls forming a separating chamber between the flues, an outlet pipe at the upper end of the separating chamber, arched deflectors extending inward and downward over the upper ends of the flues, and means for circulating air from the distributing chamber to the outlet.

4. A dust separator including a distributing chamber, a tailings hopper mounted thereon, conductor flues hinged at the sides of the hopper, side walls forming a separating chamber between the flues having an outlet pipe mounted thereon, wing followers hinged adjacent to the sides of the outlet hood and curved outward and downward with the free edges contacting with the outer walls of the flues, and means for circulating air from the distributing chamber to the outlet.

5. In a pneumatic separating system of the character described having an outside casing inclosing a mechanism consisting of a distributing chamber forming the base surmounted by a separating chamber having adjustable walls pivoted to a tailings hopper, flues in the adjustable walls through which dust laden air is conducted from the distributing chamber to the separating chamber, means for deflecting said air downwardly and inwardly toward the middle of the separating chamber, and means for exhausting said dust laden air.

6. In combination with a chamber containing an agitator and means for feeding pulverized material into said chamber to be acted upon and mixed with a current of air by said agitator, a separating chamber positioned above said distributing chamber, unrestricted flues or air passage ways for conducting the dust laden air from the distributing chamber into the upper part of the separating chamber and means for directing it downward therein.

7. In a pneumatic separating system, the combination of a distributing chamber, an adjustable separating chamber, flues for conducting dust laden air from the distributing chamber to the upper part of the separating chamber, and arched deflectors on the flues for controlling the path of the air current on entering the separating chamber.

8. In a pneumatic separating system, the combination of a distributing chamber, an adjustable separating chamber, flues for conducting dust laden air from the distributing chamber to the upper part of the separating chamber, and means for causing the air to move first downward and then upward in the separating chamber.

9. In a pneumatic separating system, the combination of a distributing chamber and an adjustable separating chamber, flues leading from the distributing chamber to the upper part of the separating chamber, means for circulating a substantially uniform volume of air through the chambers, and means for directing the flow of air first downward and then upward within the separating chamber.

10. In a pneumatic separator of the character described, a distributing chamber containing means for agitating and scattering pulverized material into an air current, a separating chamber having an outside casing and adjustable walls contained therein for increasing or decreasing the cross sectional area of said separating chamber independent of the outside casing, pneumatic flues or air passages leading from the distributing chamber and entering the separating chamber near the top thereof, arched adjustable deflecting plates mounted on the top of said flues to direct and control the path of the air current, means for creating and maintaining the flow of a constant and uniform volume of dust laden air through the separator, means for delivering said air to a dust collector to separate the dust from the dust laden air, and means for returning the purified air back to the separator.

WILLIAM S. OSBORNE.

Witnesses:
 EARL C. CARLSON,
 LOUISE M. CORBY.